United States Patent
Edwards

[11] Patent Number: 5,435,178
[45] Date of Patent: Jul. 25, 1995

[54] BLAST GAUGE WHEREIN FOUR PRESSURE SENSORS ARE POSITIONED IN A TETRAHEDRAL CONFIGURATION ON THE SURFACE OF A SPHERE

[75] Inventor: David G. Edwards, Cranleigh, England

[73] Assignee: G. D. Engineering Associates Limited, Bramley, England

[21] Appl. No.: 969,159
[22] PCT Filed: Aug. 2, 1991
[86] PCT No.: PCT/GB91/01319
§ 371 Date: Feb. 5, 1993
§ 102(e) Date: Feb. 5, 1993
[87] PCT Pub. No.: WO92/02799
PCT Pub. Date: Feb. 20, 1992

[30] Foreign Application Priority Data
Aug. 6, 1990 [GB] United Kingdom ........... 9017180

[51] Int. Cl.⁶ ............... G01W 1/00; G01F 1/74
[52] U.S. Cl. ............... 73/170.15; 73/862.045; 73/862.043
[58] Field of Search ........... 73/170.08, 170.09, 170.15, 73/170.01, 180, 700, 35 P, 35 KS, 862.627, 862.045, 862.042, 862.043, 862.044, 775, 777, 776, 862.628, 861.08

[56] References Cited
U.S. PATENT DOCUMENTS

| | | | |
|---|---|---|---|
| 2,855,779 | 10/1958 | Zard | 73/180 |
| 3,318,146 | 5/1967 | De Leo et al. | 73/180 |
| 3,603,951 | 9/1971 | Bracken | 73/170.15 |
| 3,695,103 | 10/1972 | Olson | 73/170.29 |
| 3,930,412 | 1/1976 | Mallon et al. | 73/398 AR |
| 4,207,621 | 6/1980 | Clearwaters et al. | 367/122 |
| 4,232,547 | 11/1980 | Kasper | 73/862.628 |
| 4,498,348 | 2/1985 | Wesson | 73/170.15 |
| 4,635,479 | 1/1987 | Salisbury, Jr. et al. | 73/862.045 |
| 4,659,034 | 4/1987 | Diekmann | 244/1 TD |
| 5,170,670 | 12/1992 | Fasching et al. | 73/861.08 |

FOREIGN PATENT DOCUMENTS

| | | |
|---|---|---|
| 626086 | 7/1949 | United Kingdom . |
| 1553251 | 9/1979 | United Kingdom . |
| 2144308 | 2/1985 | United Kingdom . |
| 2246861 | 7/1992 | United Kingdom . |

Primary Examiner—Richard E. Chilcot, Jr.
Assistant Examiner—William Oen
Attorney, Agent, or Firm—Christopher John Rudy

[57] ABSTRACT

The blast gauge has a spherical fairing containing four pressure sensors whose positions on the surface of the sphere form the apices of a tetrahedron. The fairing may have a solid metal sphere with cavities adapted to house the pressure sensors in which the metal is aluminum or an alloy thereof or a foam filled spherical shell containing cavities adapted to house the pressure sensors. The spherical fairing is carried by a tubular support adapted to contain the signal leads from the sensors. In a preferred form the blast gauge includes computing means adapted to receive the signals from the pressure sensors and provide data showing the velocity and direction of any shock wave impinging upon the spherical fairing.

8 Claims, 3 Drawing Sheets

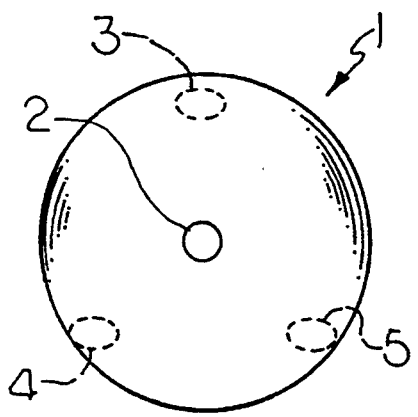
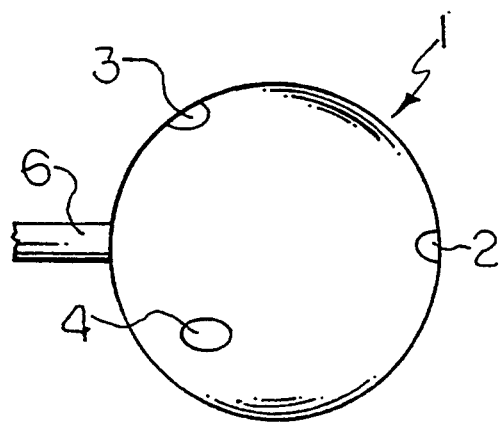
FIG. 1A　　　FIG. 1B
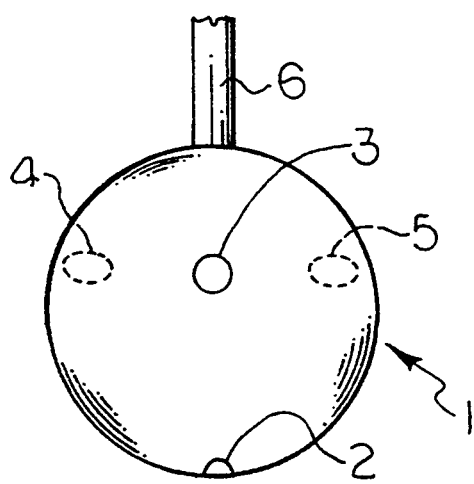
FIG. 1C

BLAST GAUGE WHEREIN FOUR PRESSURE SENSORS ARE POSITIONED IN A TETRAHEDRAL CONFIGURATION ON THE SURFACE OF A SPHERE

BACKGROUND TO THE INVENTION

I. Field of the Invention

This invention relates to blast gauges and particularly to a non-directional gauge for blast measurements.

II. Description of Known Art

Measurement of blast involves the insertion of an instrumented body into the flow field. Gauges of this type are known which feature a conventional pressure transducer housed within a streamlined fairing. The fairing is designed to cause minimal perturbation of the blast field being measured. Such known gauges only function accurately when aligned in such a way that the incident blast wave traverses the face of the transducer at grazing incidence. Such alignment requires advance knowledge of the direction of travel of the blast wave.

When measurements of blast waves are made in enclosed surroundings, such as rooms, both direct and reflected waves are produced which travel in different directions. A gauge may be set to measure one of the waves, but it will be misaligned with respect to most of the other waves that arise. The measurement of the reflected waves is most important as they may interact and comprise a stronger force than the initial wave. If a reflected wave should arrive at right angles to the face of the transducer in such a gauge, the perceived pressure could be more than double the true static value. It is clear that such directional blast gauges are of little value when blast measurements need to be made in enclosed surroundings.

SUMMARY OF THE INVENTION

The present invention provides a non-directional blast gauge which will record the amplitude of a blast wave regardless of its orientation. The gauge is also capable of providing directional information for each wave reaching it.

According to the present invention there is provided a blast gauge comprising a spherical fairing containing four pressure sensors whose positions on the surface of the sphere form the apices of a tetrahedron.

The spherical fairing may be hollow or comprise a solid block with recesses to accept the sensors. The fairing may be constructed from wood, metal or a synthetic polymer or composite based on such a polymer such as resin bonded glass fiber. The fairing may comprise a metal or synthetic polymer shell containing a foam filling. In a preferred form the fairing is fabricated from aluminum or an alloy thereof. The size of the spherical fairing should be small to avoid disrupting the blast wave pattern. However the minimum size of the fairing is also limited by the particular timing method being used and the consequent need to allow a reasonable time delay between the shock waves impinging on the transducers contained in it. Accuracy is reduced if the fairing is too small. In practice the minimum size is determined by the size of the sensors which are contained within it. The signals from the sensors are carried by conductors through cavities in the interior of the fairing into a tubular support or sting. The support must have sufficient rigidity to withstand any incident blast; however its diameter must also be as low as possible so as not to perturb the blast waves passing it.

The pressure sensors may be standard sensors which are commercially available or formed using piezo-sensitive film. "Endevco" sensors and those supplied by Entran Devices, both from the United States of America, are particularly effective. However other types may be used.

The signals from the pressure sensors are fed to signal processing means where the amplitude of the incident pressure on each sensor and its time of occurrence are stored. The stored information may be used to provide details of the amplitude and direction of successive blast waves which fall on the gauge following an initial event.

BRIEF DESCRIPTION OF THE DRAWINGS

In order that the invention be clearly understood it will now be described with reference to the accompanying drawings in which:

FIGS. 1A, 1B and 1C show a plan and two side views of a blast gauge according to the invention.

FIG. 4 is a calibration graph showing the relationship between shock travel around the gauge to time.

FIG. 5 is a diagrammatic representation of a shock wave impinging on a gauge according to the invention.

DESCRIPTION OF ILLUSTRATIVE EMBODIMENTS

A blast gauge according to the invention (See FIGS. 1A, 1B and 1C.) comprises a spherical shell 1, containing four tetrahedrally located sensors 2, 3, 4 and 5 whose sensitive faces are located at the surface of the sphere 1. Sensor 2 is located on the top of the sphere 1 while the other sensors, 3, 4 and 5, are located in the lower hemisphere. The base of the sphere 1 carries a sting 6 which supports the sphere 1 and forms a conduit for the leads from the sensors.

Figure 2:
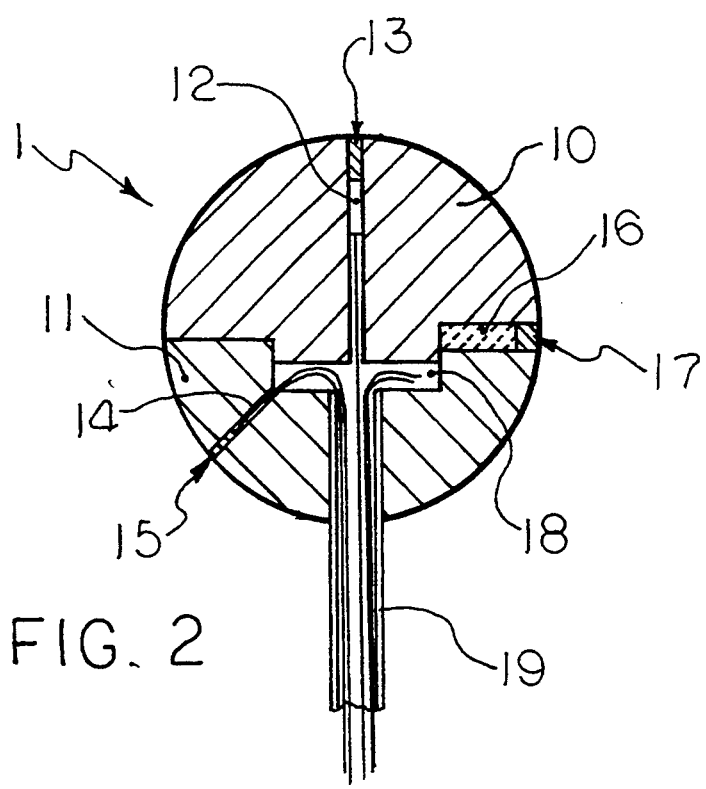
FIG. 2 is a cross-sectional view of the gauge shown in FIG. 1.

The spherical shell (See FIG. 2.) is made up of two sections 10 and 11 which fit together. The upper section 10 contains a tubular cavity 12 which contains a pressure sensor 13 (the same feature as the feature numbered 2 in FIG. 1) whose sensitive face is located at the surface and which cavity carries signal leads from the sensor. The lower section 11 contains a tubular cavity 14 which contains a pressure sensor 15 (the same feature as the feature numbered 3 in FIG. 1) and two other cavities, not shown, containing sensors. A threaded cavity 16 contains a screw 17 which holds the two sections 10 and 11 together. The leads from the pressure sensors 13 and 15 pass through the cavities in which they are located, together with those from a third and fourth pressure sensor, not shown in FIG. 2 (but which correspond to the features numbered 4 and 5 in FIG. 1), and meet in a small chamber 18. The leads pass through chamber 18 into a tubular sting 19 (the same feature as the feature numbered 6 in FIG. 1) which acts as a conduit for the leads and a support for the spherical shell.

The electrical signals from the sensors are amplified and recorded in known manner. The signals are preferably converted to and stored in digital form so that they can be processed by computer to provide information relating to the velocity and angle of attack of any shock wave which passes across the sphere.

In a preferred form of the gauge the sphere had a diameter of 50 mm and was drilled with four tubular cavities. Each cavity housed an "Endevco" pressure transducer type 8507A. These transducers are approximately 10 mm in length and 2 mm in diameter. The sting had a diameter of 5 mm.

Figure 3:
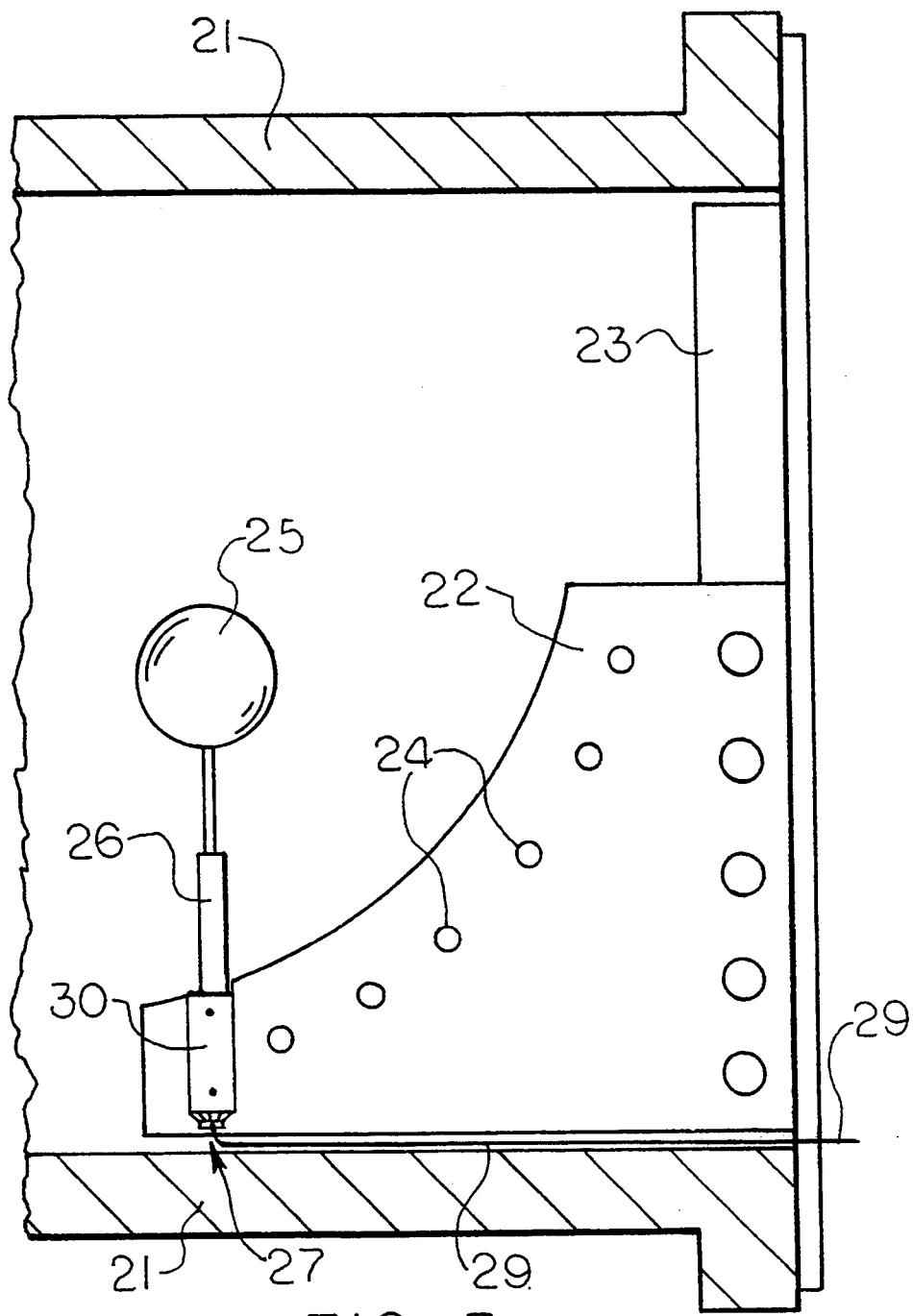
FIG. 3 is a schematic view of a calibration system.

Calibration tests were carried out on the gauge by mounting it in a large diameter shock tube. The testing rig (See FIG. 3.) consisted of a shock tube 21 containing an angular position plate 22 attached to a mounting bracket 23 fitted within the tube 21. The plate 22 carries a series of mounting holes 24. The gauge 25 is positioned within the tube 21 by attachment of its sting 26 to rotary mount 27 retained by one of the mounting holes 24. A small space 28 below the bracket 23 contains the signal leads 29. The sting 26 is prevented from rotation during use by a clamping block 30.

The testing rig allows the attitude of the spherical blast gauge to be varied in pitch and roll with respect to the blast wave directed down the shock tube.

A series of tests were made using shock waves having a triangular front. Between each run the attitude of the gauge was altered. The first signal from one sensor was used to trigger a transient recorder which provided a record of both amplitude and time for the output from each sensor.

The recorded signals allow the time interval between the arrival of the front of the shock wave to pass each sensor to be determined. By the use of suitable computing methods it is possible to determine the velocity of the initial shock wave.

The values of time interval obtained can be converted into the corresponding values of shock velocity and the three direction cosines of the normal to the shock front. As the orientation of the gauge will be known in any measurement situation, the direction cosines of the axes to each of the four transducers can be calculated.

A calibration graph (See FIG. 4.) shows the relationship between the shock wave travel around a spherical gauge according to the invention with respect to time. The vertical axis shows the angle $\theta$ in degrees and the horizontal axis time. The angle $\theta$ is the angle subtended by the normal to the shock front to the center of the sphere (See FIG. 5.) in which a shock front 31, traveling in a direction shown by the arrows, is shown impinging on a sphere 32 containing pressure sensors, not shown.

I claim:

1. A blast gauge comprising a spherical fairing containing four pressure sensors whose positions on the surface of the sphere form the apices of a tetrahedron.

2. A blast gauge according to claim 1, in which the fairing comprises a solid metal sphere with cavities adapted to house the pressure sensors.

3. A blast gauge according to claim 2, in which the metal is aluminum or an alloy thereof.

4. A blast gauge according to claim 1, in which the fairing comprises a foam filled spherical shell containing cavities adapted to house the pressure sensors.

5. A blast gauge according to claim 4, in which the shell is metal.

6. A blast gauge according to claim 1, 2, 3, 4 or 5, in which the spherical fairing is carried by a tubular support adapted to contain signal leads from the sensors.

7. A blast gauge according to claim 6, which includes computing means adapted to receive signals from the pressure sensors and provide data showing velocity and direction of any shock wave impinging upon the spherical fairing.

8. A blast gauge according to claim 1, 2, 3, 4 or 5, which includes computing means adapted to receive signals from the pressure sensors and provide data showing velocity and direction of any shock wave impinging upon the spherical fairing.

* * * * *